United States Patent
Del Prado Pavon et al.

(10) Patent No.: US 7,236,502 B2
(45) Date of Patent: Jun. 26, 2007

(54) INTERNAL SIGNALING METHOD TO SUPPORT CLOCK SYNCHRONIZATION OF NODES CONNECTED VIA A WIRELESS LOCAL AREA NETWORK

(75) Inventors: Javier Del Prado Pavon, Ossining, NY (US); Sunghyun Choi, Seoul (KR)

(73) Assignee: Koninklijke Philips Electronics N. V., Eindhoven (NL)

( * ) Notice: Subject to any disclaimer, the term of this patent is extended or adjusted under 35 U.S.C. 154(b) by 1075 days.

(21) Appl. No.: 10/319,871

(22) Filed: Dec. 13, 2002

(65) Prior Publication Data

US 2003/0169774 A1    Sep. 11, 2003

Related U.S. Application Data

(60) Provisional application No. 60/369,550, filed on Apr. 3, 2002, provisional application No. 60/362,518, filed on Mar. 7, 2002.

(51) Int. Cl.
*H04J 3/06* (2006.01)

(52) U.S. Cl. ..................... 370/500

(58) Field of Classification Search ............... 370/503, 370/324, 350
See application file for complete search history.

(56) References Cited

U.S. PATENT DOCUMENTS

| | | | | |
|---|---|---|---|---|
| 6,081,533 | A | 6/2000 | Laubaach et al. | 370/421 |
| 6,347,084 | B1 | 2/2002 | Hulyalkar et al. | 370/347 |
| 6,804,222 | B1* | 10/2004 | Lin et al. | 370/338 |
| 6,834,045 | B1* | 12/2004 | Lappetelainen et al. | 370/329 |

FOREIGN PATENT DOCUMENTS

WO    0213429 A1    2/2002

* cited by examiner

*Primary Examiner*—Wing Chan
*Assistant Examiner*—Richard Chang

(57) ABSTRACT

This invention discloses a set of internal signaling (i.e., management primitives) to support a clock-synchronization protocol for wirelessly synchronizing clock registers of wired or wireless nodes via a wireless local area network (i.e., 802.11 network). The clock synchronization is performed between two higher-layer protocol entities residing within two different wireless stations (STAs).

13 Claims, 4 Drawing Sheets

INTERNAL SIGNALING METHOD TO SUPPORT CLOCK SYNCHRONIZATION OF NODES CONNECTED VIA A WIRELESS LOCAL AREA NETWORK

CROSS REFERENCE TO RELATED APPLICATIONS

This application claims the benefit of U.S. Provisional Application Ser. No. 60/362,518 filed on Mar. 7, 2002, and U.S. Provisional Application Ser. No. 60/369,550 filed on Apr. 3, 2002, the teachings of which are incorporated herein by reference.

BACKGROUND OF THE INVENTION

1. Field of the Invention

The present invention generally relates to clock synchronization and, more particularly, to an internal signaling method to support stringent clock synchronization at a higher-layer protocol.

2. Description of the Related Art

High-precision clock synchronization is one of the most basic requirements in distributed real-time systems. Due to the unavoidable drift of local clocks, a global time base can be achieved only by means of a clock-synchronization protocol. Co-pending U.S. application Ser. No. 60/362,518, filed on Mar. 7, 2002, incorporated by reference herein in its entirety, is directed to a clock-synchronization protocol for wirelessly synchronizing clock registers of wired or wireless nodes via a wireless local area network (i.e., 802.11 network). To support the clock-synchronization protocol disclosed therein, there is a need for a set of management primitives (i.e., internal signaling) which will provide information about the synchronization frames from the medium access control (MAC) to a higher-layer protocol.

SUMMARY OF THE INVENTION

The present invention provides a set of internal signaling (i.e., management primitives) to support a clock-synchronization protocol for wirelessly synchronizing clock registers of wired or wireless nodes via a wireless local area network (i.e., 802.11 network). The clock synchronization is performed between two higher-layer protocol entities residing within two different wireless stations (STAs).

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, where:

FIG. 3 is an illustration of an 802.11 management architecture for describing the master node of FIG. 2a;

DETAILED DESCRIPTION OF THE PRESENT INVENTION

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. In some instances, well-known structures and devices are shown in block-diagram form, rather than in detail, in order to avoid obscuring the present invention.

The present invention is described below in the context of synchronizing 1394 wireless nodes via an 802.11 wireless LAN. However, it is to be appreciated that the teachings of the invention discussed herein are not so limited. That is, the invention is applicable to any communication system, wired or wireless, that requires stringent synchronization as defined herein. For example, the present invention has applicability to wired communication systems, such as IEEE 802.3 and Ethernet.

Figure 1:
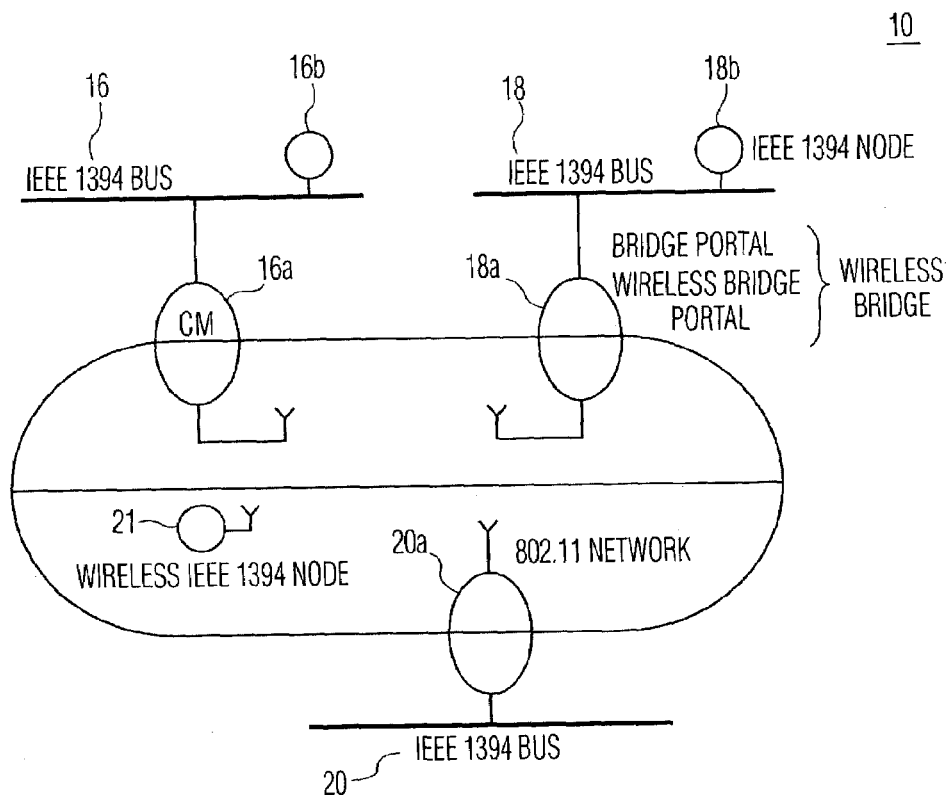
FIG. 1 illustrates the architecture of a wireless communication system whereto embodiments of the present invention are to be applied.

With reference now to the figures, and in particular with reference to FIG. 1, an IEEE 802.11 wireless network 10, in which a preferred embodiment of the present invention may be implemented, is depicted. As shown, the network 10 includes 1394 buses 16, 18, and 20, which in the exemplary embodiment have associated there-with wireless bridges (nodes) 16a, 18a, and 20a. Wireless bridges 16a, 18a, and 20a serve as entrance points through which wireless communications may occur over the network 10 between the 1394 buses 16, 18, and 20. The network 10 also includes a 1394 stand-alone wireless node 21, which can represent any stand-alone device such as a digital video camera or a palm device, which is able to use the 1394 protocol to communicate with other devices. The network 10 further includes wired 1394 nodes 16b and 18b.

The exemplary embodiment of FIG. 1 is shown only to describe the present invention more clearly and those skilled in the art will recognize that numerous variations are possible, both in form and function. For instance, the network 10 might include a greater or lesser number of 1394 buses and/or any other kind of nodes requiring synchronization. Network 10 may also include a greater or lesser number of stand-alone nodes or non-stand alone nodes requiring synchronization. It should be appreciated that the network 10 may use the 802.11 WLAN technology, as shown in the exemplary embodiment of FIG. 1, or any other kind of wireless/wired communication system to connect wireless/wired nodes/buses. All such variations are believed to be within the spirit and scope of the present invention. The network 10 and the exemplary figures below are provided solely as examples for the purposes of explanation and are not intended to imply architectural limitations.

To perform clock synchronization in the network 10, time-stamp values are generated from a node arbitrarily designated as a master node (or "root node") in the network 10. In the network 10, the node 16a is arbitrarily selected as the master-clock master node to which every other non-master node (slave node) in the network is synchronized. The master node 16a in the network 10 has the role of clock distribution Within the network.

Figure 2A:
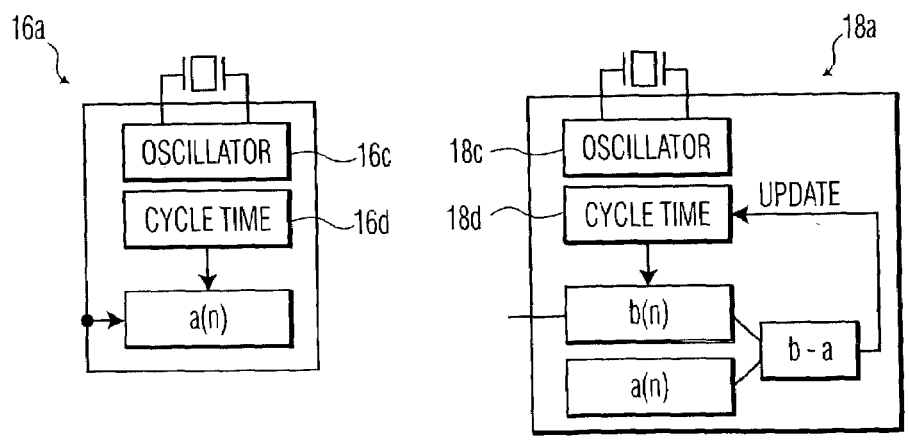
FIG. 2a illustrates the master node and a representative non-master node from the communication system of FIG. 1.

With reference now to FIG. 2a, for easy explanation, the process of clock synchronization is described using only the master node 16a and a single non-master node 18a are shown. It is noted that the operations performed in the single illustrated non-master node 18a occur in an identical fashion in all other non-master nodes of the network 10. FIG. 2a illustrates the constitution of the master node 16a and non-master node 18a according to an embodiment of the invention. The master node 16a and non-master node 18a are shown to include the internal 24.576 MHz clocks (oscillators) 16c and 18c and associated cycle-time registers 16d and 18d. The 24.576 clocks 16c and 18c run freely and update the contents of the associated cycle-time registers 16d and 18d. The cycle-time registers 16d and 18d provide fields that specify the current time value, and awrite to the cycle time register initializes the clock hardware to the value 20 contained in the write transaction. The elements that constitute the master node 16a and non-master node 18a are conventional and will not be described further.

Figure 2B:
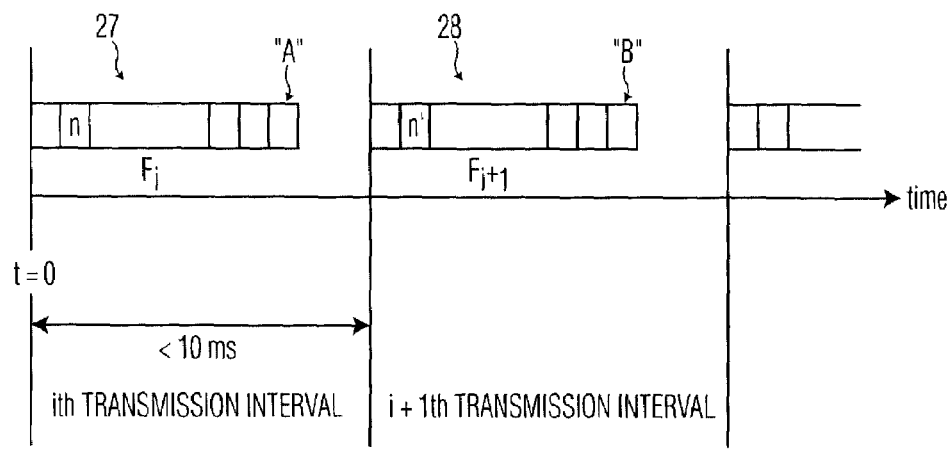
FIG. 2b illustrates two successively transmitted synchronization frames which are transmitted at near-periodic intervals from the master node to all of the non-master nodes.

FIG. 2b illustrates two successively-transmitted synchronization frames, $F_i$ 27 and, $F_{i+1}$ 28 to perform clock synchronization. The synchronization frames 27 and 28 may be transmitted at near-periodic intervals from the master node 16a to all of the non-master nodes—i.e., non-master node 18a—in the network 10. Each synchronization frame is identified by both its source address (i.e., the MAC address of the master node transmitting the frame) and a destination address. The destination address is a special multicast address reserved explicitly for performing clock synchronization. Each synchronization frame includes clock-synchronization information to synchronize cycle-time registers 16d and 18d at near-periodic intervals. Synchronization frames 27 and 28 are generated from the master node 16a so as to synchronize the higher-layer protocol entities which reside within the master node 16a and the non-master nodes 18. The present invention is directed to a method for supporting these higher-layer protocols.

To illustrate the management primitives between the Station Management Entity (SME) and the MAC of the master node 16a and the non-master node 18, an 802.11 general-management architecture is described below and illustrated in FIG. 3. The management primitives are described herein for a 1394 clock-synchronization application; however, it is noted that the management primitives of the invention have broader application to any higher-layer protocol that requires stringent synchronization.

Figure 3:
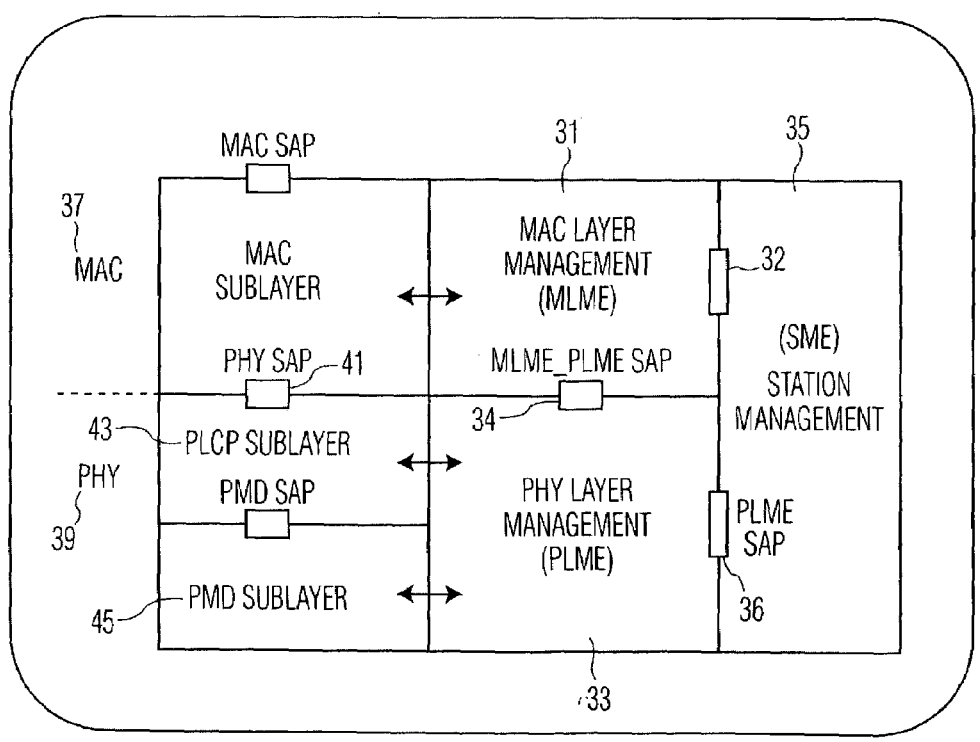

FIG. 3 illustrates an 802.11 management architecture for describing nodes 16a and 18a. The architecture is comprised of three components; a MAC-layer management entity (MLME) 31, a physical-layer management entity (PLME) 33, and a system management entity (SME) 35. There are three defined interfaces among the management components 32, 34, and 36. The SME 35 may alter both the MAC and the PHY Management Information Bases (MIBs). Both the MAC 37 and PHY 39 layers have access to the MIBs. The MIBs can be queried to gain status information, as well as objects that can cause certain actions to take place. The MLME layer 31 communicates with the PLME 33 via specific primitives through an MLME_PLME service access point (SAP) 34. When the MLME layer 31 instructs, the PLME sublayer 33 instructs the PLCP sublayer 43 to prepare MPDUs for transmission. The PLCP sublayer 43 also delivers incoming frames from the wireless medium to the MAC layer 37. The PLCP sublayer 43 minimizes the dependence of the MAC layer 37 on the PMD sublayer 45 by mapping MPDUs into a frame format suitable for transmission by the PMD sublayer 45. Under the direction of the PLCP sublayer 43, the PMD sublayer 45 provides actual transmission and reception of PHY entities between two stations through the wireless medium. To provide this service, the PMD sublayer 45 interfaces directly with the air medium and provides modulation and demodulation of the frame transmissions.

Figure 4:
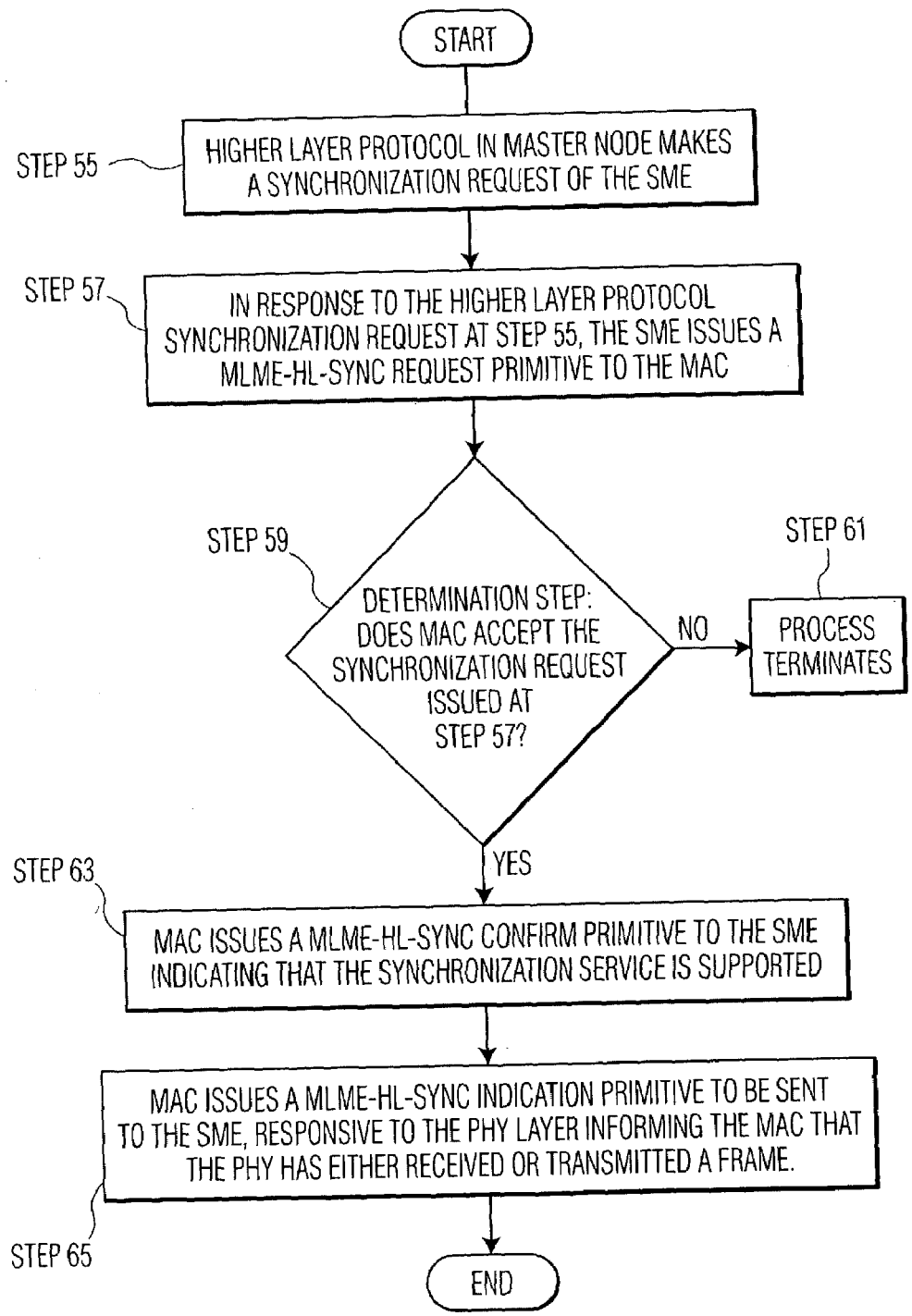
FIG. 4 is a flow chart illustrating the operation steps for supporting clock synchronization according to an embodiment of the present invention; and, FIG. 5 is a process flow diagram further illustrating the operational steps of the flowchart of FIG. 4.
Figure 5:
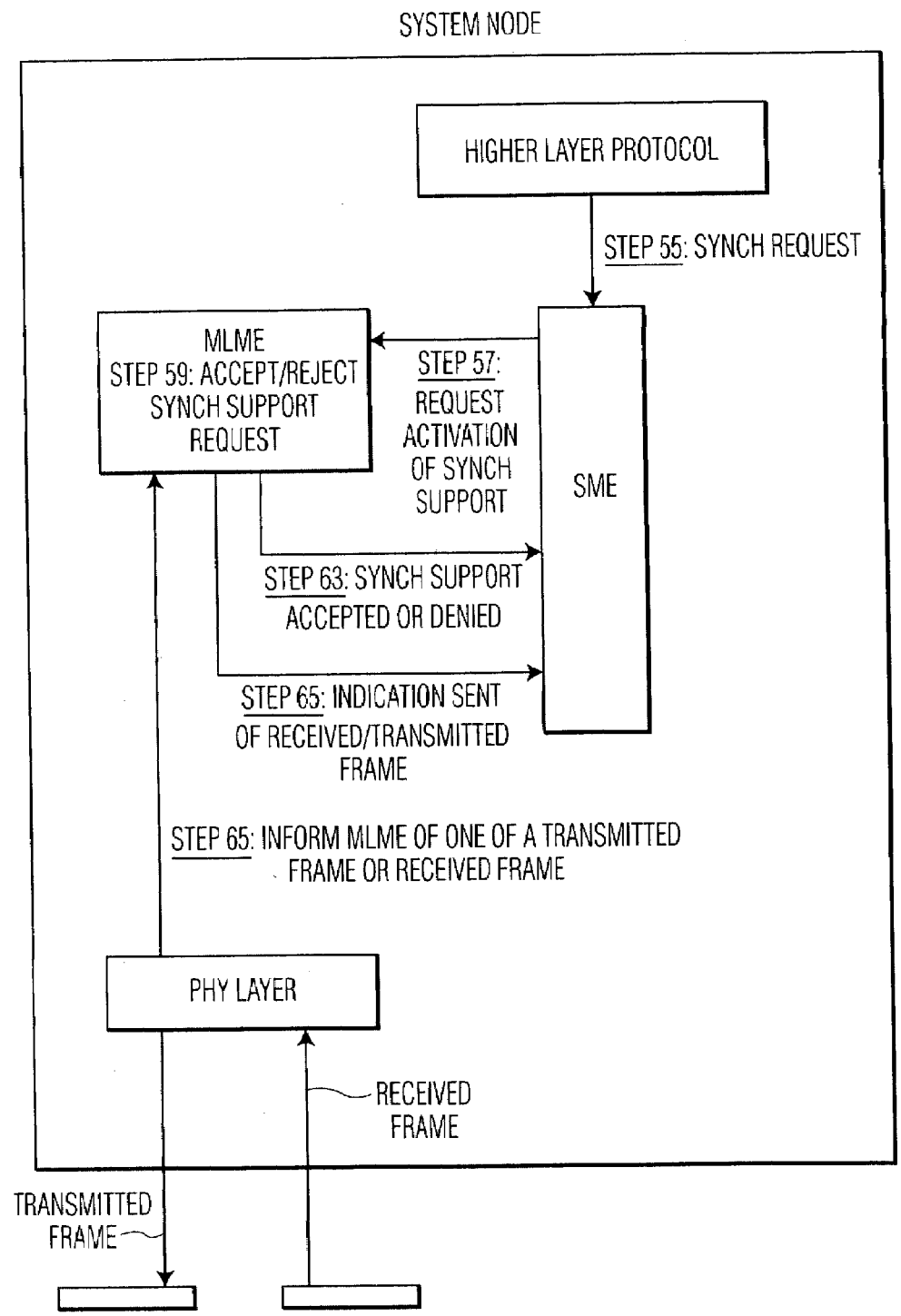

With reference now to the flowchart of FIG. 4 and the process flow diagram of FIG. 5, described below are illustrative steps involved in supporting clock synchronization of a higher-layer protocol, such as the wireless nodes of FIG. 1 in accordance with an exemplary embodiment of the present invention.

The process starts at step 55 where a higher-layer protocol in the master node 16a makes a synchronization request of the SME. Synchronization request from the higher-layer protocol is required to initiate the higher-layer synchronization protocol. The SME then issues a synchronization request to the MLME 31 in the form of a MLME-HL-SYNC.request primitive which specifically requests activation of the synchronization-support mechanism in the MLME 31. The first management primitive is described as follows:

A. The General form of the MLME-HL-SYNC.request Primitive

MLME-HL-SYNC.request {
    RxAdress
}

B. Parameter Description

TABLE 1

| Parameter Name | Parameter Type | Valid Parameter Range | Parameter Description |
|---|---|---|---|
| RxAdress | MACAddress | A multicast MAC address | Specifies the multicast address that the synchronization frames are addressed to: |

It should be noted that the MAC layer 37 has no way of knowing on its own which frames are synchronization frames. It therefore must have some way of recognizing synchronization frames when they are issued by the higher-layer protocol. The "RxAddress" parameter is the means by which the MAC layer 37 recognizes a frame as a synchronization frame. Specifically, the "RxAddress" informs the MAC layer 37 that when the MAC layer 37 receives a frame from the higher layers or from the PHY layer, having a destination address equal to "RxAddress," which is a multicast address, that frame should be identified by the MAC layer 37 as a synchronization frame.

At step 59, it is determined whether or not the MAC layer 37 accepts the synchronization-service request from the SME 35. If the service request is not accepted by the MAC layer 37, then the process terminates at step 61. Otherwise if the MAC layer 37 accepts the synchronization-service request of the SME 35 then the process continues at step 63.

At step 61, the process terminates because the MAC layer 37 does not accept the synchronization-service request from the SME. In this case the MLME 31 issues an MLME-HL-SYNC.confirm primitive to the SME 35 indicating that the synchronization service is not supported in the MAC layer 37 with the parameter setting: "ResultCode"=Not Supported.

At step 63, the synchronization-service request is determined to have been accepted by the MAC layer 37. In this case, the MLMF 31 issues the MLME-HL-SYNC.confirm primitive to the SME indicating that the synchronization service is supported, with the parameter setting, "ResultCode"=Success.

A. The General form of the MLME-HL-SYNC.confirm Primitive

MLME-HL-SYC.confirm {
    ResultCode
}

B. Parameter Description

TABLE II

| Parameter Name | Parameter Type | Valid Parameter Range | Parameter Description |
|---|---|---|---|
| ResultCode | Enumeration | *Success *Not Supported | Indicates the result of the MLME-HL-SYNC request |

At step 65, a third primitive reports the complete transmission/reception of a synchronization frame. Specifically, an MLME-HL-SYNC.indication primitive is generated by the MLME 31 and sent to the SME 35 as a result of the PLME 33 informing the MLME 31 that it has received/transmitted a frame.

This third primitive involves two cases: reception and transmission of synchronization frames. Reception of synchronization frames takes place at the non-master nodes—i.e., node 18a, which receive synchronization frames from the master node—i.e., node 16a. Transmission of synchronization frames takes place at the master node 16a.

In the case of a synchronization frame being received at a non-master node 18a, the MAC layer 37 will look at the destination address of the synchronization frame being received and compare it to its own "RxAddress" previously specified by the MLME-HL-SYNC.request primitive. In the case of a match, the MLMT 31 will indicate to the SME 35, via the MLME-HL-SYNC.indication primitive, that it has received a synchronization frame. The MLME-HL-SYNC.indication is issued when the last symbol on air of the received synchronization frame is detected and announced by the PHY layer.

In the case of a synchronization frame being transmitted from the master node 16a, the MAC layer 37 will look at the destination address of the transmitted frame and compare it with its own "RxAddress" previously specified by the MLME-HL-SYNC.request primitive. In the case of a match, the MLME 31 will indicate to the SME 35, via the MLME-HL-SYNC.indication primitive, that it has transmitted a synchronization frame. The MLME-HL-SYNC.indication is issued when the last symbol on air of the transmitted synchronization frame is detected and announced by the PHY layer.

A. The General form of the Primitive

MLME-HL-SYNC.indication {
    TxAddress
    SequenceNumber
    ProcDelay
}

B. Parameter Description

TABLE III

| Parameter Name | Parameter Type | Valid Parameter Range | Parameter Description |
|---|---|---|---|
| TxAddress | MACAddress | Any valid individual MAC address | Specifies the address of the MAC entity that sent the synchronization frame. In the case of the STA sending the frame, it will be its own MAC address |
| SequenceNumber | Enumeration | As defined in the frame format | Specifies the sequence number of the synchronization frame received/transmitted |
| ProcDelay | Enumeration | ≥0 | Specifies the estimated time (in usec?) between the generation of this primitive and the time at which some predetermined detection point of the frame that generated this primitive is detected on the air. |

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. In a communication system including a plurality of non-master nodes communicatively coupled to a network, each of said plurality of non-master nodes having a local time base, one of said plurality of non-master nodes being designated as a master node having a master time base which serves as a master clock against which said non-master local time bases are synchronized, a method for supporting clock synchronization in a higher-layer protocol of said master and non-master nodes, the method comprising the steps of:
(a) making a synchronization request at a higher-layer protocol of said master node;
(b) issuing a request primitive from a station management entity (SME) associated with said node to a MAC layer management entity (MLME) requesting a synchronization-support mechanism;
(c) determining, at said MLME, whether to accept said synchronization-support-mechanism request at said step (b);
(d) issuing a confirm primitive, from said MLME to said SME, indicating that said synchronization-support mechanism is supported, where said request is accepted at said step (c);
(e) reporting one of a reception and transmission of a frame from a physical layer (PHY) associated with said node to said MLME; and
(f) issuing an indication primitive from said MLME to said SME responsive to said step (e).

2. The method of claim 1, wherein said method further comprises the steps of:
terminating the synchronization request by said MLME in the case where it is determined by said MLME not to accept said synchronization-support mechanism at step (c); and
issuing an MLME-HL-SYNC.confirm primitive with a ResultCode parameter equal to "Not accepted".

3. The method of claim 1, wherein said indication primitive issued from said MLME to said SME is issued when a last symbol on air of a received or transmitted synchronization frame is detected and announced by the PHY layer.

4. The method of claim 1, wherein said request primitive transmitted from said SME to said MLME is an MLME-HL-SYNC request primitive having the general form:

```
MLME-HL-SYNC.request {
                      RxAddress
                     }
``` where: RxAddress is a multicast address.

5. The method of claim 1, wherein said confirmation primitive issued from said MLME to said SME is an MLME-HL-SYNC request primitive having the general form:

```
MLME-HL-SYNC.confirm {
                      ResultCode
                     }
``` where: ResultCode=has a value of "support" or "no support".

6. The method of claim 1, wherein the indication primitive issued from said MLME to said SME is an MLME-HL-SYNC indication primitive having the general form:

```
MLME-HL-SYNC.indication {
                         TxAddress
                         SequenceNumber
                         ProcDelay
                        }
``` where:
TxAddress—specifies the address of the MAC entity sending the synchronization frame;
SequenceNumber—specifies the sequence number of the synchronization frame; and
ProeDelay—specifies the estimated time between the generation of the primitive and the time at which some predetermined detection point of the frame that generated this primitive is detected on the air.

7. The method of claim 1, wherein said network is one of a wireless and wired network.

8. In a communication system including a plurality of non-master nodes communicatively coupled to a network, each of said plurality of non-master nodes having a local time base, one of said plurality of non-master nodes being designated as a master node having a master time base which serves as a master clock against which said non-master local time bases are synchronized, the system comprising:
means for making a synchronization request at a higher-layer protocol of said master node;
means for issuing a request primitive from a station management entity (SME) associated with said node to a MAC layer management entity (MLME) requesting a synchronization-support mechanism;
means for determining, at said MLME, whether to accept said synchronization-support mechanism request at said step (b);
means for issuing a confirm primitive, from said MLME to said SME, indicating that said synchronization-support mechanism is supported, where said request is accepted at said step (c);
means for reporting one of a reception or transmission of a frame from a physical layer (PHY) associated with said node to said MLME; and
means for sending an indication primitive from said MLME to said SME responsive to said step (e).

9. The system of claim 8, wherein said system further comprises:
means for terminating the synchronization request by said MLME in the case where it is determined by said MLME not to accept said synchronization-support mechanism at step (c); and
means for issuing an MLME-HL-SYNC.confirm primitive with a ResultCode parameter indicating non-acceptance of said synchronization-support mechanism.

10. The system of claim 8, wherein said means for sending an indication primitive further comprises means for indicating when a last symbol on air of a received or transmitted synchronization frame is detected and announced by the PHY layer.

11. The system of claim 8, wherein said request primitive includes at least one parameter specifying a multicast address.

12. The system of claim 8, wherein said indication primitive includes at least a first parameter for specifying the address of the MAC entity sending the synchronization frame, and a second parameter for specifying the sequence number of the synchronization frame, and a third parameter for specifying the estimated time between the generation of the primitive and the time at which some predetermined detection point of the frame that generated the primitive is detected in the air.

13. The system of claim 8, wherein said network is one of a wireless and wired network.

* * * * *